US012759353B2

(12) United States Patent
Nolf

(10) Patent No.: US 12,759,353 B2
(45) Date of Patent: Oct. 13, 2026

(54) TRAILER HITCH RESTRICTOR ASSEMBLY

(71) Applicant: Bobby Nolf, Jasper, AL (US)

(72) Inventor: Bobby Nolf, Jasper, AL (US)

(*) Notice: Subject to any disclaimer, the term of this patent is extended or adjusted under 35 U.S.C. 154(b) by 569 days.

(21) Appl. No.: 18/209,754

(22) Filed: Jun. 14, 2023

(65) Prior Publication Data

US 2024/0416696 A1 Dec. 19, 2024

(51) Int. Cl.
*B60D 1/30* (2006.01)

(52) U.S. Cl.
CPC .................................... *B60D 1/30* (2013.01)

(58) Field of Classification Search
CPC .................................. B60D 1/30; B60D 1/32
See application file for complete search history.

(56) References Cited

U.S. PATENT DOCUMENTS 3,420,549 A * 1/1969 Robinson ............... B60D 1/363 280/477
3,588,809 A * 6/1971 Devlin ..................... B60D 1/36 280/400
3,871,686 A 3/1975 Rendessy
5,236,215 A * 8/1993 Wylie .................... B60D 1/363 280/507
6,976,694 B1 * 12/2005 Rayl ...................... B60D 1/363 280/477
7,540,523 B2 6/2009 Russell
9,415,646 B1 8/2016 Rand
D832,748 S 11/2018 Scott
10,220,878 B2 3/2019 Herzog
10,710,420 B2 7/2020 Akins
2009/0108567 A1 4/2009 Robinson
2018/0093539 A1 * 4/2018 Akins ...................... B60D 1/56

FOREIGN PATENT DOCUMENTS

WO WO2017096122 6/2017

* cited by examiner

*Primary Examiner* — Jacob D Knutson

(57) ABSTRACT

A trailer hitch restrictor assembly includes an extension tube that is attachable to a hitch receiver of a tow vehicle. A pivot mount is positioned on the extension tube and the pivot mount includes a pair of pivot points and a plurality of stop points. A pair of arms is each pivotally attachable to a respective pivot point thereby facilitating each of the pair of arms to be positioned on either side of a hitch of a trailer being towed by the tow vehicle. A pair of bumpers is each pivotally attachable to a respective arm to abut the hitch of the trailer when the tow vehicle negotiates a turn thereby inhibiting the trailer from jackknifing on the tow vehicle. A pair of stops is each attachable to a respective stop point thereby inhibiting a respective one of the arms from pivoting toward the tow vehicle.

16 Claims, 7 Drawing Sheets

TRAILER HITCH RESTRICTOR ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hitch restrictor devices and more particularly pertains to a new hitch restrictor device for inhibiting a trailer from jackknifing on a tow vehicle. The device includes a pivot mount that is attachable to a hitch receiver of a vehicle and a pair of arms that are pivotally attached to the pivot mount. The arms can be positioned to angle in opposite directions from the pivot mount that the arms inhibit the trailer from jackknifing on the tow vehicle when the tow vehicle is negotiating a turn.

(2) Description of Related Art Including Information Disclosed Under 37 CFR 1.97 and 1.98

The prior art relates to hitch restrictor devices including a variety of anti-jackknifing hitches that includes a framework of members intersecting in a triangular arrangement, an anti-jackknifing hitch that includes a pair of arms that are pivotally attached to a hitch mount to inhibit a trailer from jackknifing and a hitch receiver that has a pair of wings for inhibiting a trailer from jackknifing. In no instance does the prior art disclose an anti-jackknifing hitch that includes arms that are positionable at a variety of angles to inhibit a trailer from jackknifing and stops for inhibiting the movement of the arms.

BRIEF SUMMARY OF THE INVENTION

An embodiment of the disclosure meets the needs presented above by generally comprising an extension tube that is attachable to a hitch receiver of a tow vehicle. A pivot mount is positioned on the extension tube and the pivot mount includes a pair of pivot points and a plurality of stop points. A pair of arms is each pivotally attachable to a respective pivot point thereby facilitating each of the pair of arms to be positioned on either side of a hitch of a trailer being towed by the tow vehicle. A pair of bumpers is each pivotally attachable to a respective arm to abut the hitch of the trailer when the tow vehicle negotiates a turn thereby inhibiting the trailer from jackknifing on the tow vehicle. A pair of stops is each attachable to a respective stop point thereby inhibiting a respective one of the arms from pivoting toward the tow vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
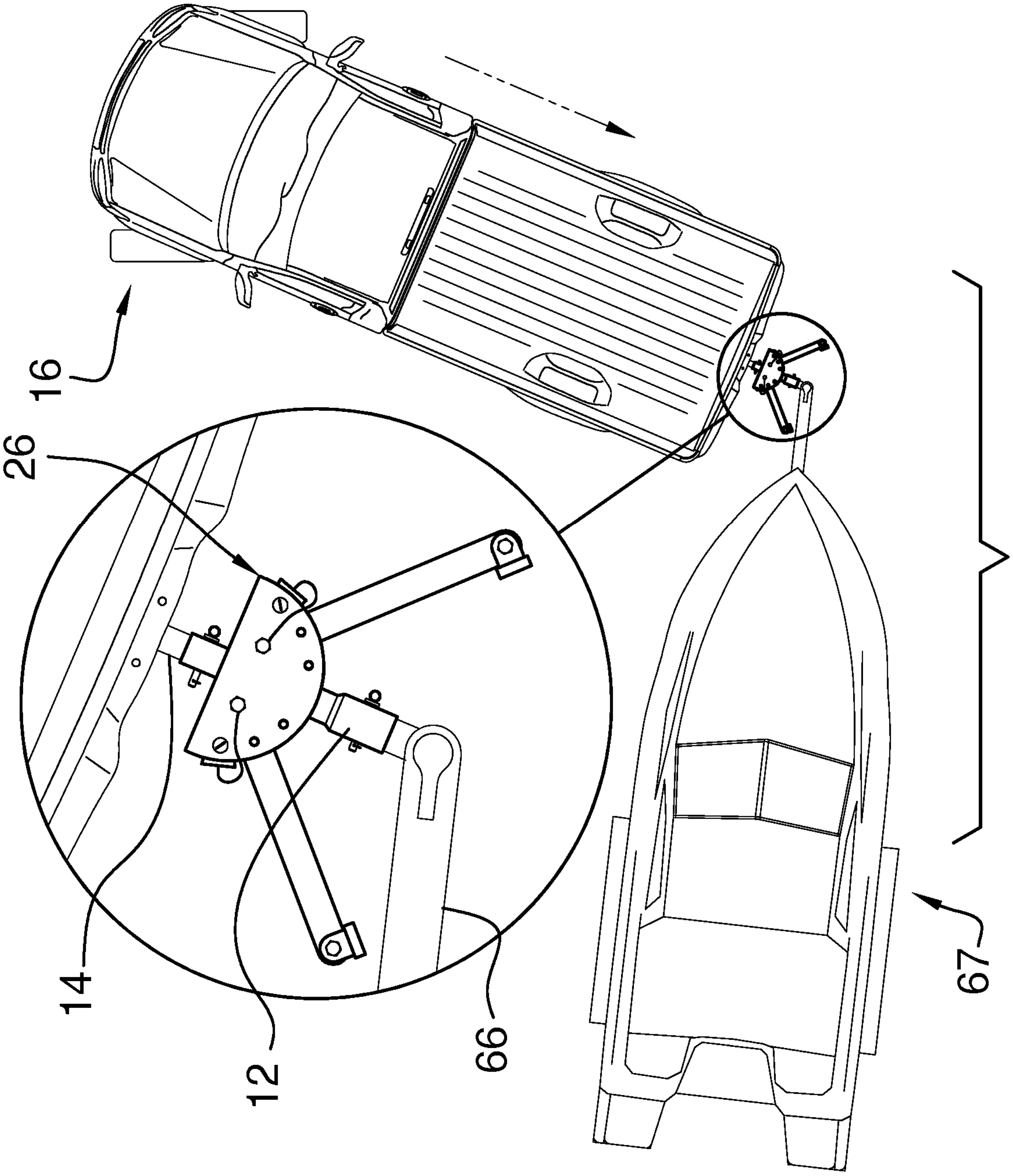
FIG. 1 is a top in-use view of a trailer hitch restrictor assembly according to an embodiment of the disclosure.
Figure 2:
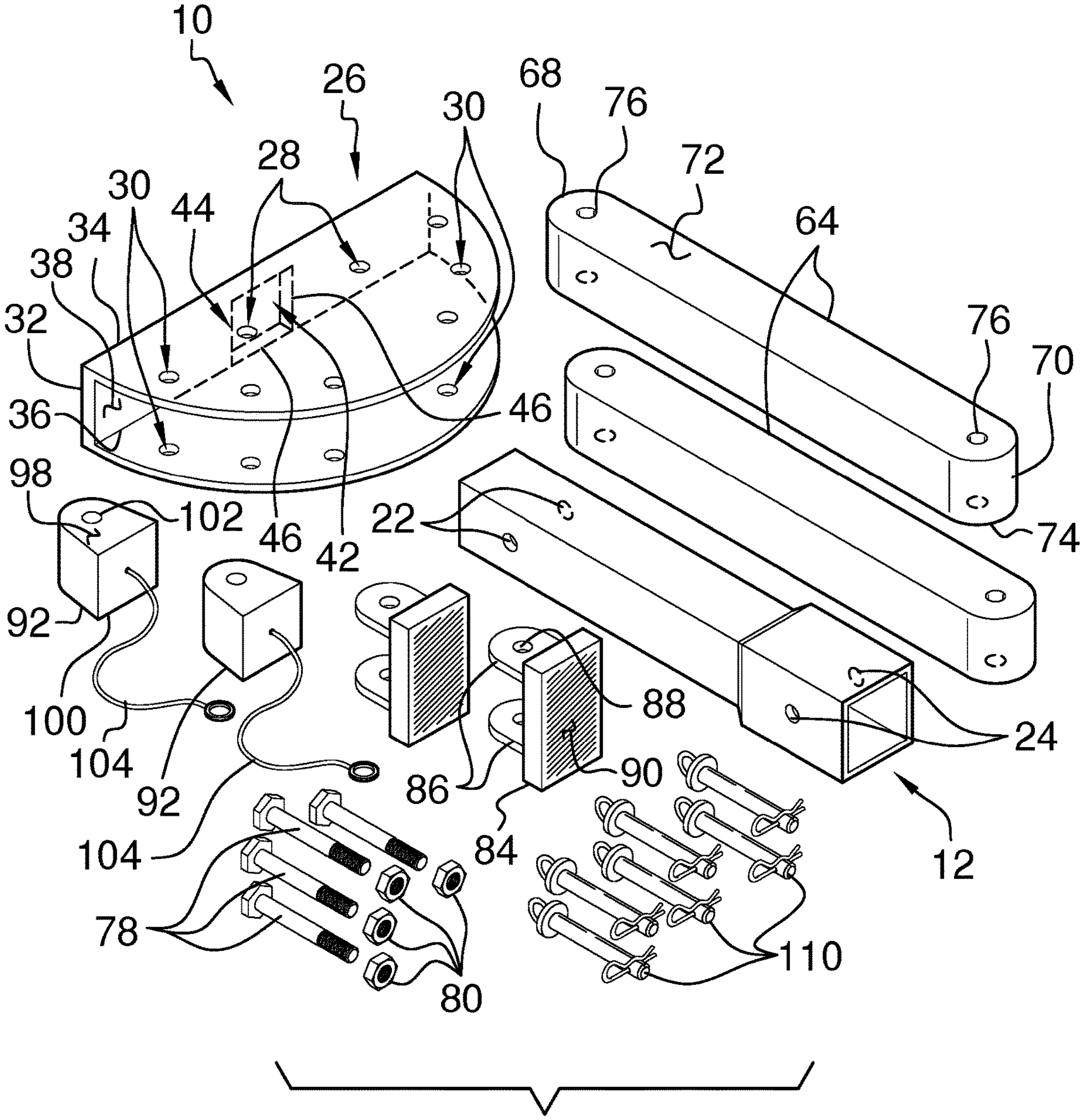
FIG. 2 is a perspective view of an embodiment of the disclosure.
Figure 3:
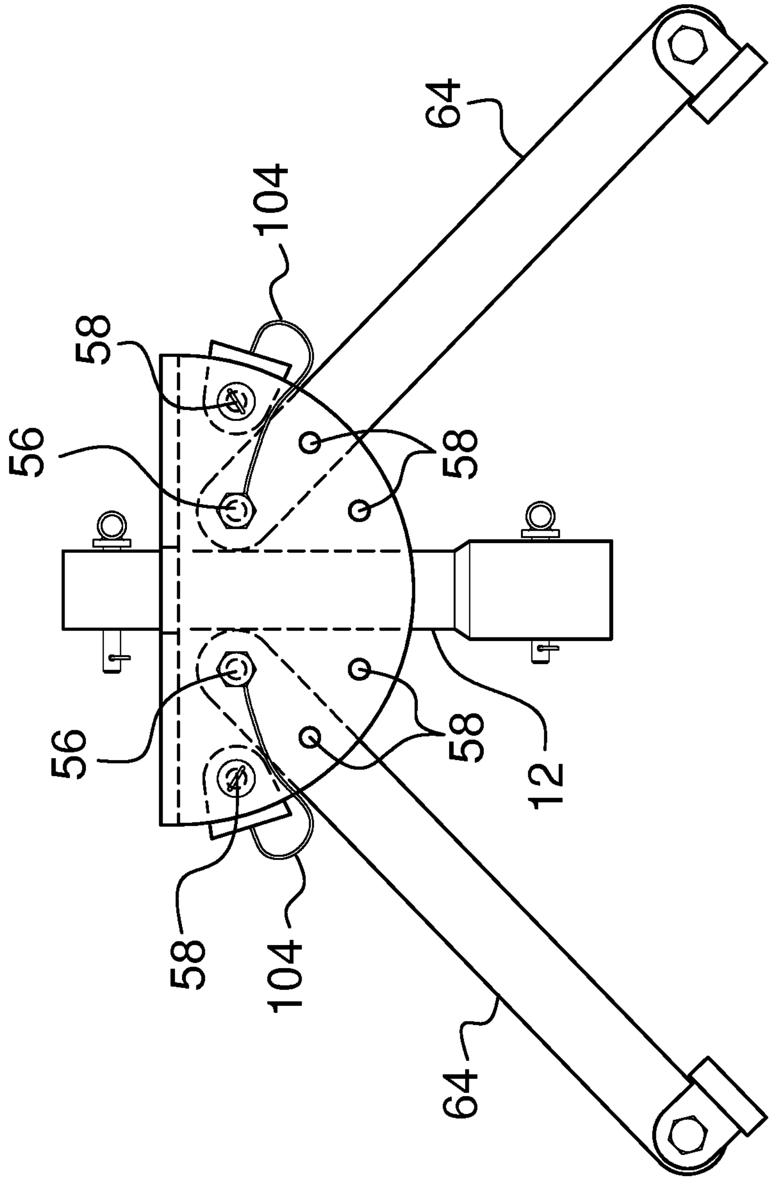
FIG. 3 is a top phantom view of an embodiment of the disclosure showing a pair of arms in a deployed position.
Figure 4:
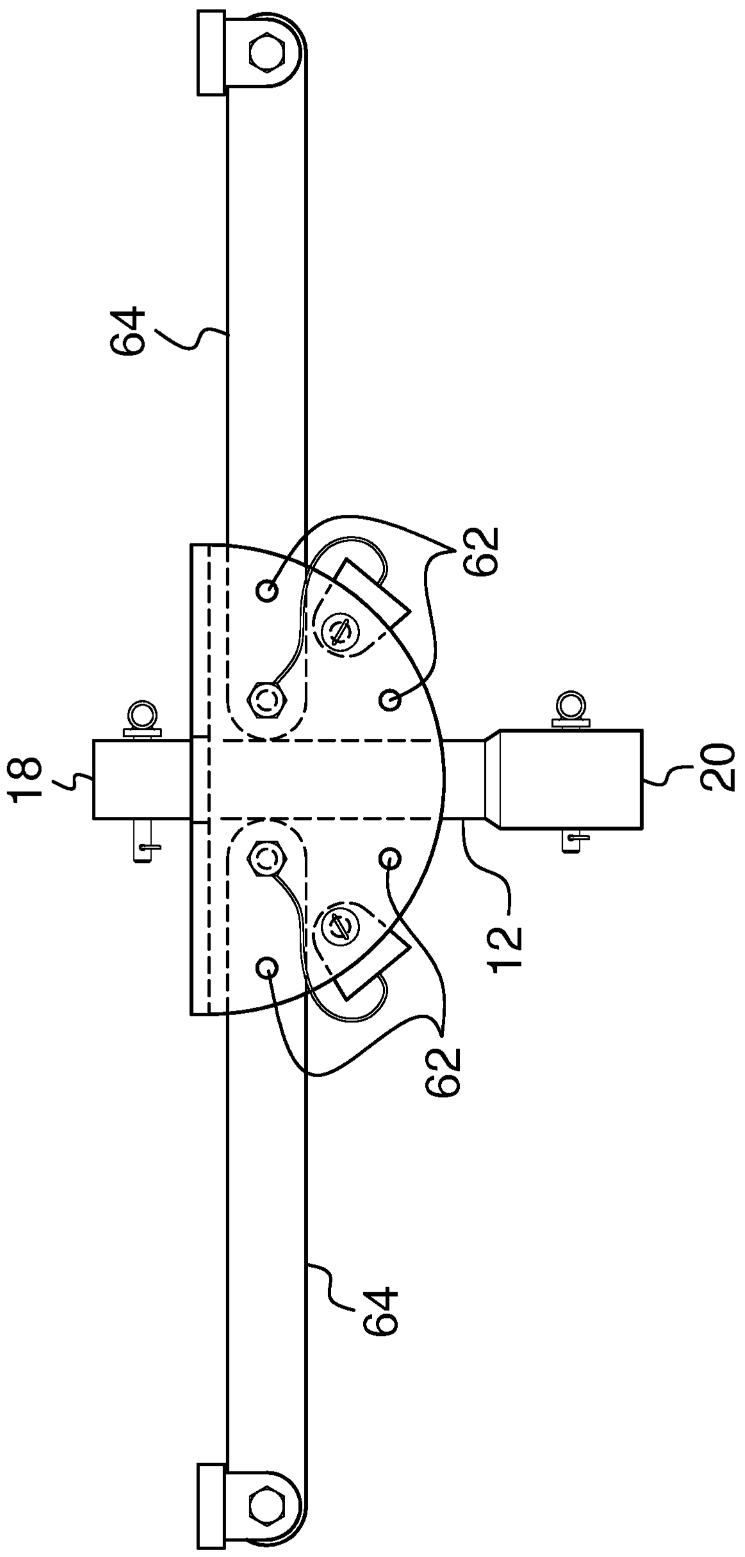
FIG. 4 is a top phantom view of an embodiment of the disclosure showing a pair of arms in a stored position.
Figure 5:
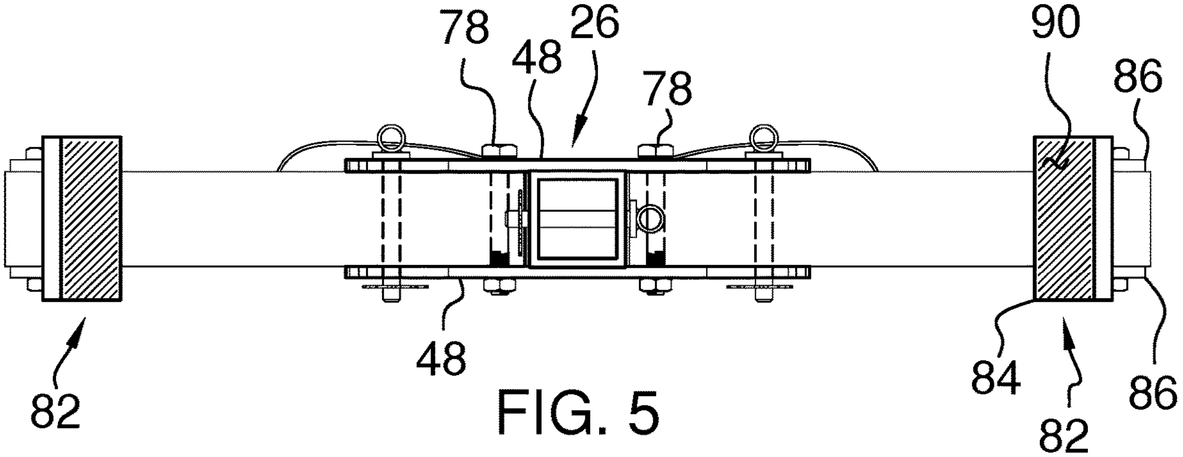
FIG. 5 is a back view of an embodiment of the disclosure.
Figure 6:
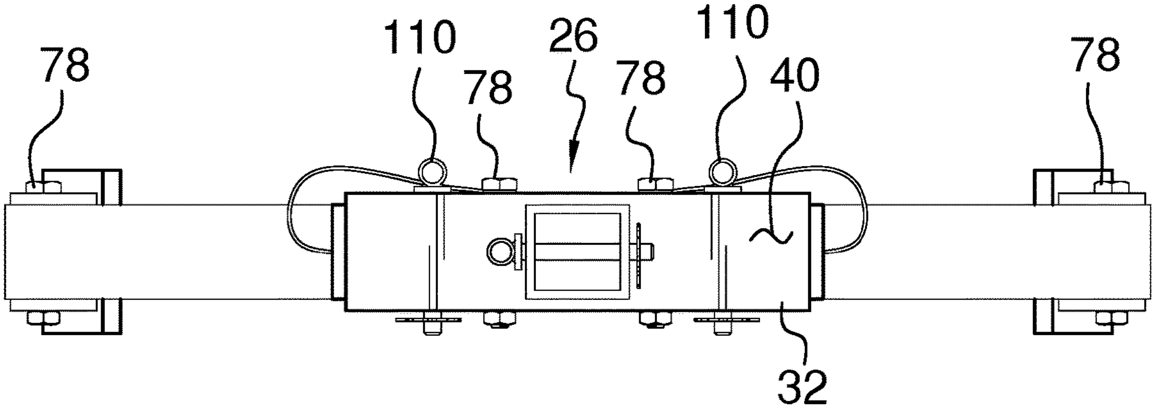
FIG. 6 is a front view of an embodiment of the disclosure.
Figure 7:
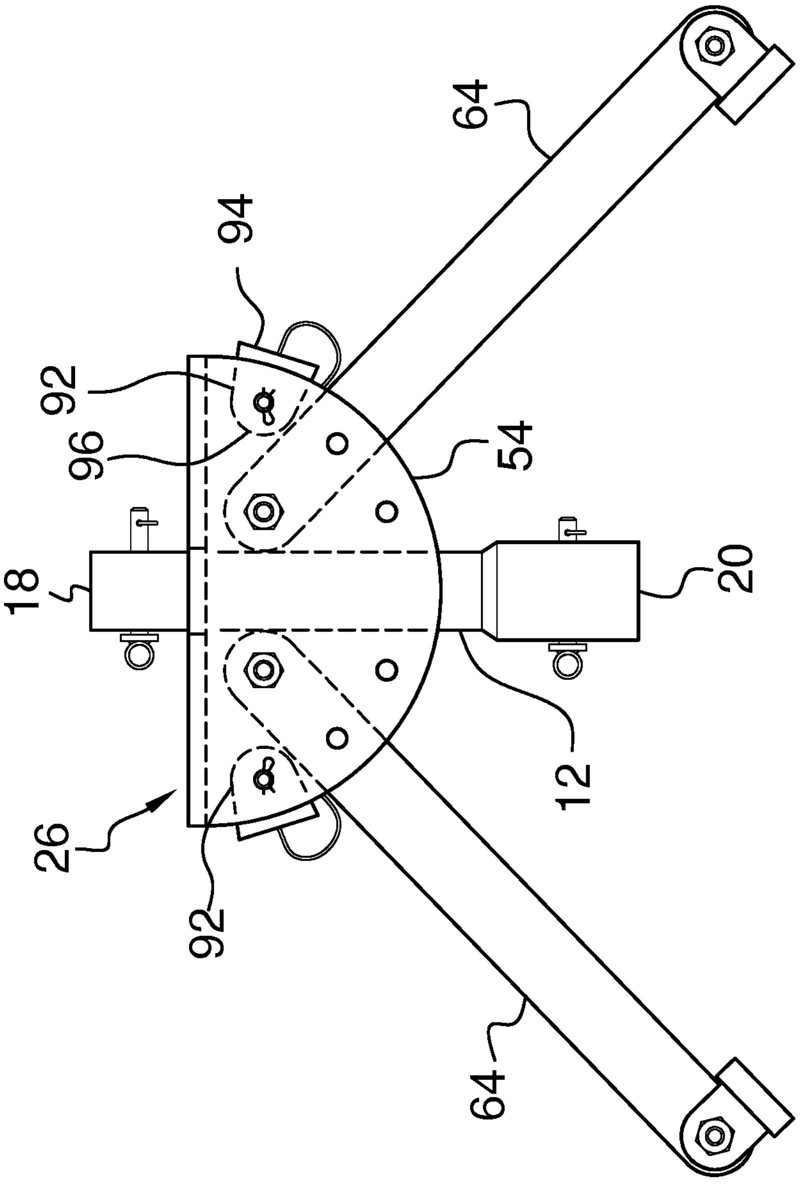
FIG. 7 is a bottom phantom view of an embodiment of the disclosure.
Figure 8:
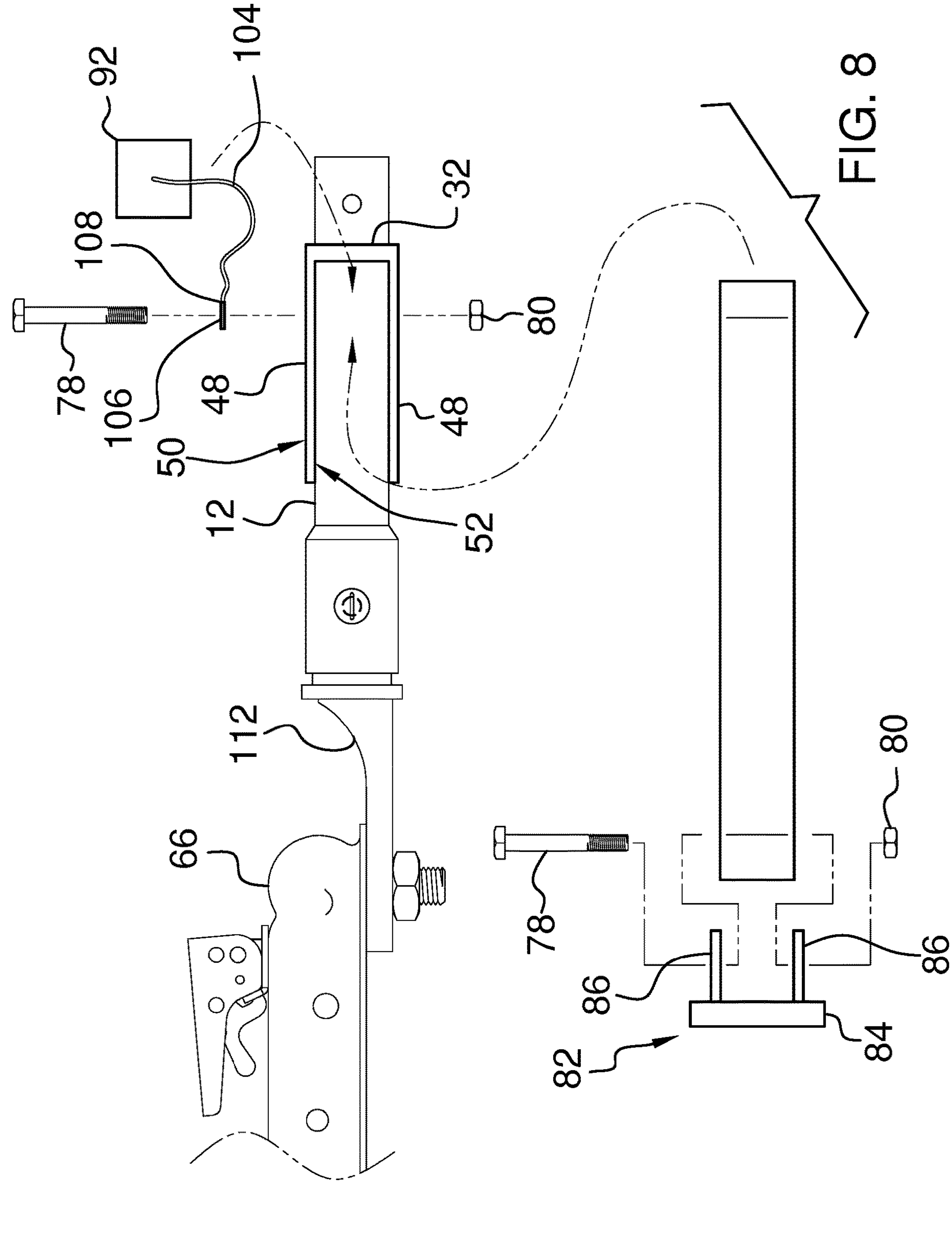
FIG. 8 is an exploded perspective view of an embodiment of the disclosure.

With reference now to the drawings, and in particular to FIGS. 1 through 8 thereof, a new hitch restrictor device embodying the principles and concepts of an embodiment of the disclosure and generally designated by the reference numeral 10 will be described.

As best illustrated in FIGS. 1 through 8, the trailer hitch restrictor assembly 10 generally comprises an extension tube 12 is attachable to a hitch receiver 14 of a tow vehicle 16. The extension tube 12 has a first end 18 and a second end 20 and the extension tube 12 is flared adjacent to the second end 20 such that the second end 20 has a larger perimeter than the first end 18. A pair of first holes 22 each extends through the extension tube 12 and each of the pair of first holes 22 is positioned on opposite sides of the extension tube 12 at a point located closer to the first end 18 than the second end 20. A pair of second holes 24 each extends through the extension tube 12 and each of the pair of second holes 24 is positioned on opposite sides of the extension tube 12 at a point located closer to the second end 20 than the first end 18. Furthermore, the first end 18 is insertable into the hitch receiver 14 of the tow vehicle 16.

A pivot mount 26 is positioned on the extension tube 12 and the pivot mount 26 has a pair of pivot points 28 and a plurality of stop points 30. The pivot mount 26 comprises a central panel 32 that has a top edge 34, a bottom edge 36, a front surface 38 and a back surface 40. The central panel 32 has a hole 42 extending through the front surface 38 and the back surface 40 and the hole 42 is centrally positioned on the central panel 32. The first end 18 of the extension tube 12 is insertable through the hole 42. Furthermore, the hole 42 has a bounding edge 44 and the bounding edge 44 has a plurality of intersecting sides 46 such that the hole 42 has a rectangular shape thereby inhibiting the central panel 32 from rotating on the extension tube 12 when the extension tube 12 is extended through the hole 42. Additionally, the central panel 32 may be permanently attached to the extension tube 12 via a weld or other means of permanent attachment.

The pivot mount 26 includes a pair of pivot panels 48 that are perpendicularly oriented with the front surface 38 of the central panel 32 and each of the pivot panels 48 is aligned with a respective one of the top edge 34 and the bottom edge 36 of the central panel 32. Each of the pivot panels 48 has a top surface 50, a bottom surface 52 and an exposed edge 54 extending between the top surface 50 and the bottom surface 52 and the exposed edge 54 of each of the pivot panels 48 is curved such that each of the pivot panels 48 has a semicircular shape. Each of the pivot panels 48 has a pair of bolt holes 56 each extending through the top surface 50 and the bottom surface 52 of the pivot panels 48 such that each of the bolt holes 56 in each of the pivot panels 48 defines a respective one of the pivot points 28 of the pivot mount 26. Additionally, each of the bolt holes 56 associated with a respective one of the pivot panels 48 is positioned on opposite sides of a central axis of the respective pivot panel 48. Each of the bolt holes 56 in the respective pivot panel 48 is positioned closer to the central panel 32 than the exposed edge 54 of the respective pivot panel 48.

Each of the pivot panels 48 has a plurality of stop holes 58 each extending through the top surface 50 and the bottom surface 52 such that each of the plurality of stop holes 58 defines a respective one of the stop points 30 of the pivot mount 26. The stop holes 58 associated with each of the pivot panels 48 is spaced apart from each other and is distributed along the exposed edge 54. The plurality of stop holes 58 in each of the pivot panels 48 comprises a set of first stop holes 60 and a second of second stop holes 62 that is each positioned on opposite sides of the central axis.

A pair of arms 64 is provided and each of the pair of arms 64 is pivotally attachable to a respective one of the pivot points 28 of the pivot mount 26. Each of the pair of arms 64 extends outwardly from the pivot mount 26 at an adjustable angle in opposite directions from each other. In this way each of the pair of arms 64 can be positioned on either side of a hitch 66 of a trailer 67 that is towed by the tow vehicle 16. Each of the pair of arms 64 has a first end 68, a second end 70, a top surface 72 and a bottom surface 74. Each of the first end 68 and the second end 70 of each of the pair of arms 64 is rounded about an axis extending between the top surface 72 and the bottom surface 74 of the arms 64.

Each of the pair of arms 64 has a pair of holes 76 each extending through the top surface 72 and the bottom surface 74. Each of the holes 76 in a respective one of the pair of arms 64 is positioned proximate a respective one of the first end 68 and the second end 70 of the respective arm 64. Additionally, each of the pair of arms 64 is inserted between the pair of pivot panels 48 such that a respective one of the holes 76 associated with each of the pair of arms 64 is aligned with a respective one of the bolt holes 56 in each of the pivot panels 48. A plurality of bolts 78 is provided and respective ones of the plurality of bolts 78 is insertable through a respective one of the bolt holes 56 in each of the pair of pivot panels 48 and through the respective hole 76 in the respective arm 64 that is aligned with the respective bolt hole 56 for pivotally attaching the respective arm 64 to the pair of pivot panels 48. Additionally, a plurality of nuts 80 is provided and each of the nuts 80 is threadable onto a respective one of the bolts 78.

A pair of bumpers 82 is provided and each of the pair of bumpers 82 is pivotally attachable to a respective one of the arms 64. A respective one of the pair of bumpers 82 abuts the hitch 66 of the trailer 67 when the tow vehicle 16 negotiates a turn that exceeds a pre-determined turn radius. In this way the trailer 67 is inhibited from jackknifing on the tow vehicle 16. Each of the bumpers 82 comprises a bumper pad 84 and a pair of lobes 86 each extending away from a back surface 40 of the bumper pad 84 and each of the lobes 86 associated with each of the bumpers 82 has a hole 88 extending through the lobes 86.

The second end 20 of a respective one of the pair of arms 64 is positionable between the pair of lobes 86 associated with a respective one of the pair of bumpers 82 such that a respective one of the holes 76 in the respective arm 64 is aligned with the hole 88 in each of the lobes 86 associated with the respective bumper 82. In this way a respective one of the bolts 78 can be inserted through the pair of lobes 86 of the respective bumper 82 and the respective arm 64 for pivotally attaching the respective bumper 82 to the respective arm 64. Each of the pair of bumpers 82 is positionable to facilitate a front surface 90 of the bumper pad 84 associated with each of the bumpers 82 to be directed toward the hitch 66 of the trailer 67. Additionally, the front surface 90 of the bumper pad 84 associated with each of the bumpers 82 is comprised of a resiliently compressible material, including but not being limited to rubber, such that the front surface 90 of the bumper pad 84 is inhibited from damaging the hitch 66 of the trailer 67.

A pair of stops 92 is provided and each of the stops 92 is attachable to a respective one of the stop points 30 of the pivot mount 26. In this way each of the pair of stops 92 can inhibit a respective one of the arms 64 from pivoting toward the tow vehicle 16. Thus, the pair of stops 92 facilitates the pair of arms 64 to inhibit the trailer 67 from jackknifing on the tow vehicle 16. Each of the stops 92 has a primary end 94, a secondary end 96, an upper surface 98 and a lower surface 100. The secondary end 96 of each of the stops 92 is rounded about an axis extending through the upper surface 98 and the lower surface 100. Each of the stops 92 flares between the secondary end 96 and the primary end 94 such that the primary end 94 has a greater width than the secondary end 96.

Each of the stops 92 has a hole 102 extending through the upper surface 98 and the lower surface 100. The hole 102 in a respective one of the stops 92 is aligned with a respective one of the first stop holes 58 and the hole 102 in a respective one of the stops 92 is aligned with a respective one of the second stop holes 58. Furthermore, a respective one of the bolts 78 is insertable through the pair of pivot panels 48 and a respective one of the pair of stops 92 for attaching the stops 92 to the pivot panels 48. Each of the stops 92 is positionable between the respective arm 64 and the central panel 32 of the pivot mount 26 when to retain the pair of arms 64 in a deployed position for inhibiting the trailer 67 from jackknifing. Conversely, each of the pair of arms 64 is positionable between the central panel 32 of the pivot mount 26 and a respective one of the stops 92 for retaining the pair of arms

64 in a stored position thereby inhibiting either of the pair of arms 64 from abutting the hitch 66 of the trailer 67.

A pair of tethers 104 is provided and each of the tethers 104 is coupled to and extends away from the primary end 94 of a respective one of the stops 92. Each of the tethers 104 has a ring 106 that is disposed on a distal end 108 of the tethers 104 with respect to the primary end 94 of the respective stop 92. The ring 106 on each of the pair of tethers 104 is aligned with a respective one of the bolt holes 56 in a respective one of the pivot panels 48. A respective one of the bolts 78 is extendable through the ring 106 on a respective one of the tethers 104 to inhibit the respective stop 92 from being lost when the respective stop 92 is not attached to the pivot mount 26.

A plurality of pins 110 is provided and a respective one of the pins 110 is insertable through the pair of first holes 22 in the extension tube 12 for attaching the extension tube 12 to the hitch receiver 14 of the tow vehicle 16. A respective one of the pins 110 is insertable through the pair of second holes 24 in the extension tube 12 for attaching a hitch ball 112 to the extension tube 12. A respective one of the pins 110 is insertable through respective ones of the first stop holes 58 and a respective one of the stops 92 and a respective one of the pins 110 is insertable through respective ones of the second stop holes 58 and a respective one of the stops 92. Each of the pins 110 might include a cotter key that is extendable through a shaft of the pins 110 to inhibit the pins 110 from being removed from their respective location.

In use, the extension tube 12 is inserted into the hitch receiver 14 of the vehicle and a ball hitch 66 is attached to the extension tube 12. Each of the stops 92 is attached to a desired stop point to retain the pair of arms 64 at a desired angle with respect to the extension tube 12 and the trailer 67 is attached to the hitch ball 112. In this way each of the pair of arms 64 inhibits the trailer 67 from jackknifing on the tow vehicle 16 thereby protecting the tow vehicle 16 from being damaged by the trailer 67. Each of the pair of arms 64 can be positioned between the central panel 32 of the pivot mount 26 and the pair of stops 92 such that each of the arms 64 extends laterally away from the extension tube 12. In this way neither of the arms 64 restricts the motion of the trailer 67 behind the tow vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A trailer hitch restrictor assembly for inhibiting a trailer from jackknifing with a tow vehicle, said assembly comprising:

an extension tube being attachable to a hitch receiver of a tow vehicle;

a pivot mount being positioned on said extension tube, said pivot mount having a pair of pivot points and a plurality of stop points, said plurality of stop points being arranged to form an arc surrounding said pivot points;

a pair of arms, each of said pair of arms being pivotally attachable to a respective one of said pivot points of said pivot mount such that each of said pair of arms extends outwardly from said pivot mount at an adjustable angle in opposite directions from each other thereby facilitating each of said pair of arms to be positioned on either side of a hitch of a trailer being towed by said tow vehicle;

a pair of bumpers, each of said pair of bumpers being pivotally attachable to a respective one of said arms thereby facilitating a respective one of said pair of bumpers to abut said hitch of said trailer when said tow vehicle negotiates a turn that exceeds a pre-determined turn radius thereby inhibiting said trailer from jackknifing on said tow vehicle; and a pair of stops, each of said stops being attachable to a respective one of said stop points of said pivot mount thereby facilitating each of said pair of stops to inhibit a respective one of said arms from pivoting toward said tow vehicle such that said pair of stops facilitates said pair of arms to inhibit said trailer from jackknifing on said tow vehicle, each of said pair of stops being positionable at a respective location along said arc defined by said plurality of stop points thereby facilitating said pair of arms to be oriented at a variety of angles.

2. The assembly according to claim 1, wherein:

said extension tube has a first end and a second end, said extension tube being flared adjacent to said second end such that said second end has a larger perimeter than said first end;

said extension tube has a pair of first holes each extending through said extension tube, each of said pair of first holes being positioned on opposite sides of said extension tube at a point located closer to said first end than said second end;

said extension tube has a pair of second holes each extending through said extension tube, each of said pair of second holes being positioned on opposite sides of said extension tube at a point located closer to said second end than said first end; and said first end is insertable into said hitch receiver of said tow vehicle.

3. The assembly according to claim 2, wherein said pivot mount comprises a central panel having a top edge, a bottom edge, a front surface and a back surface, said central panel having a hole extending through said front surface and said back surface, said hole being centrally positioned on said central panel, said first end of said extension tube being insertable through said hole, said hole having a bounding edge, said bounding edge having a plurality of intersecting sides such that said hole has a rectangular shape thereby inhibiting said central panel from rotating on said extension tube when said extension tube is extended through said hole.

4. The assembly according to claim 3, wherein said pivot mount includes a pair of pivot panels being perpendicularly oriented with said front surface of said central panel, each of said pivot panels being aligned with a respective one of said top edge and said bottom edge of said central panel, each of said pivot panels having a top surface, a bottom surface and an exposed edge extending between said top surface and said bottom surface, said exposed edge of each of said pivot panels being curved such that each of said pivot panels has a semicircular shape.

5. The assembly according to claim 4, wherein each of said pivot panels has a pair of bolt holes each extending through said top surface and said bottom surface of said pivot panels such that each of said bolt holes in each of said pivot panels defines a respective one of said pivot points of said pivot mount, each of said bolt holes associated with a respective one of said pivot panels being positioned on opposite sides of a central axis of said respective pivot panel, each of said bolt holes in said respective pivot panel being positioned closer to said central panel than said exposed edge of said respective pivot panel.

6. The assembly according to claim 5, wherein:

each of said pair of arms has a first end, a second end, a top surface and a bottom surface, each of said first end and said second end of each of said pair of arms being rounded about an axis extending between said top surface and said bottom surface;

each of said pair of arms has a pair of holes each extending through said top surface and said bottom surface of said arms, each of said holes in a respective one of said pair of arms being positioned proximate a respective one of said first end and said second end of said respective arm; and each of said pair of arms is inserted between said pair of pivot panels such that a respective one of said holes associated with each of said pair of arms is aligned with a respective one of said bolt holes in each of said pivot panels.

7. The assembly according to claim 6, further comprising a plurality of bolts, respective ones of said plurality of bolts being insertable through a respective one of said bolt holes in each of said pair of pivot panels and through said respective hole in said respective arm that is aligned with said respective bolt hole for pivotally attaching said respective arm to said pair of pivot panels.

8. The assembly according to claim 6, wherein each of said bumpers comprises a bumper pad and a pair of lobes each extending away from a back surface of said bumper pad, each of said lobes associated with each of said bumpers having a hole extending through said lobes, said second end of a respective one of said pair of arms being positionable between said pair of lobes associated with a respective one of said pair of bumpers such that a respective one of said holes in said respective arm is aligned with said hole in each of said lobes associated with said respective bumper thereby facilitating a respective one of said bolts to be inserted through said pair of lobes of said respective bumper and said respective arm for pivotally attaching said respective bumper to said respective arm.

9. The assembly according to claim 8, wherein each of said pair of bumpers is positionable to facilitate a front surface of said bumper pad associated with each of said bumpers to be directed toward the hitch of the trailer, said front surface of said bumper pad associated with each of said bumpers being comprised of a resiliently compressible material such that said front surface is inhibited from damaging said hitch of said trailer.

10. The assembly according to claim 5, further comprising a pair of tethers, each of said tethers being coupled to and extending away from a primary end of a respective one of said stops, each of said tethers having a ring being disposed on a distal end of said tethers with respect to said primary end of said respective stop, said ring on each of said pair of tethers being aligned with a respective one of said bolt holes in a respective one of said pivot panels, a respective one of a plurality of bolts being extendable through said ring on a respective one of said tethers to inhibit said respective stop from being lost when said respective stop is not attached to said pivot mount.

11. The assembly according to claim 4, wherein each of said pivot panels having a plurality of stop holes each extending through said top surface and said bottom surface such that each of said plurality of stop holes defines a respective one of said stop points of said pivot mount, said stop holes associated with each of said pivot panels being spaced apart from each other and being distributed along said exposed edge.

12. The assembly according to claim 11, wherein said plurality of stop holes in each of said pivot panels comprises a set of first stop holes and a second of second stop holes each being positioned on opposite sides of a central axis of said respective pivot panel.

13. The assembly according to claim 12, wherein:

each of said stops has a primary end, a secondary end, an upper surface and a lower surface, said secondary end of each of said stops being rounded about an axis extending through said upper surface and said lower surface, each of said stops flaring between said secondary end and said primary end such that said primary end has a greater width than said secondary end, each of said stops having a hole extending through said upper surface and said lower surface;

said hole in a respective one of said stops being aligned with a respective one of said first stop holes; and said hole in a respective one of said stops being aligned with a respective one of said second stop holes.

14. The assembly according to claim 13, wherein each of said stops is positionable between said respective arm and said central panel of said pivot mount to retain said pair of arms in a deployed position for inhibiting said trailer from jackknifing.

15. The assembly according to claim 13, wherein each of said pair of arms is positionable between said central panel of said pivot mount and a respective one of said stops for retaining said pair of arms in a stored position thereby inhibiting either of said pair of arms from abutting said hitch of said trailer.

16. A trailer hitch restrictor assembly for inhibiting a trailer from jackknifing with a tow vehicle, said assembly comprising:

an extension tube being attachable to a hitch receiver of a tow vehicle, said extension tube having a first end and a second end, said extension tube being flared adjacent to said second end such that said second end has a larger perimeter than said first end, said extension tube having a pair of first holes each extending through said extension tube, each of said pair of first holes being positioned on opposite sides of said extension tube at a point located closer to said first end than said second end, said extension tube having a pair of second holes each extending through said extension tube, each of said pair of second holes being positioned on opposite sides of said extension tube at a point located closer to said second end than said first end, said first end being insertable into said hitch receiver of said tow vehicle;

a pivot mount being positioned on said extension tube, said pivot mount having a pair of pivot points and a plurality of stop points, said pivot mount comprising:

a central panel having a top edge, a bottom edge, a front surface and a back surface, said central panel having a hole extending through said front surface and said back surface, said hole being centrally positioned on said central panel, said first end of said extension tube being insertable through said hole, said hole having a bounding edge, said bounding edge having a plurality of intersecting sides such that said hole has a rectangular shape thereby inhibiting said central panel from rotating on said extension tube when said extension tube is extended through said hole; and a pair of pivot panels being perpendicularly oriented with said front surface of said central panel, each of said pivot panels being aligned with a respective one of said top edge and said bottom edge of said central panel, each of said pivot panels having a top surface, a bottom surface and an exposed edge extending between said top surface and said bottom surface, said exposed edge of each of said pivot panels being curved such that each of said pivot panels has a semicircular shape, each of said pivot panels having a pair of bolt holes each extending through said top surface and said bottom surface of said pivot panels such that each of said bolt holes in each of said pivot panels defines a respective one of said pivot points of said pivot mount, each of said bolt holes associated with a respective one of said pivot panels being positioned on opposite sides of a central axis of said respective pivot panel, each of said bolt holes in said respective pivot panel being positioned closer to said central panel than said exposed edge of said respective pivot panel, each of said pivot panels having a plurality of stop holes each extending through said top surface and said bottom surface such that each of said plurality of stop holes defines a respective one of said stop points of said pivot mount, said stop holes associated with each of said pivot panels being spaced apart from each other and being distributed along said exposed edge, said plurality of stop holes in each of said pivot panels comprising a set of first stop holes and a second of second stop holes each being positioned on opposite sides of said central axis;

a pair of arms, each of said pair of arms being pivotally attachable to a respective one of said pivot points of said pivot mount such that each of said pair of arms extends outwardly from said pivot mount at an adjustable angle in opposite directions from each other thereby facilitating each of said pair of arms to be positioned on either side of a hitch of a trailer being towed by said tow vehicle, each of said pair of arms having a first end, a second end, a top surface and a bottom surface, each of said first end and said second end of each of said pair of arms being rounded about an axis extending between said top surface and said bottom surface of said arms, each of said pair of arms having a pair of holes each extending through said top surface and said bottom surface of said arms, each of said holes in a respective one of said pair of arms being positioned proximate a respective one of said first end and said second end of said respective arm, each of said pair of arms being inserted between said pair of pivot panels such that a respective one of said holes associated with each of said pair of arms is aligned with a respective one of said bolt holes in each of said pivot panels;

a plurality of bolts, respective ones of said plurality of bolts being insertable through a respective one of said bolt holes in each of said pair of pivot panels and through said respective hole in said respective arm that is aligned with said respective bolt hole for pivotally attaching said respective arm to said pair of pivot panels;

a pair of bumpers, each of said pair of bumpers being pivotally attachable to a respective one of said arms thereby facilitating a respective one of said pair of bumpers to abut said hitch of said trailer when said tow vehicle negotiates a turn that exceeds a pre-determined turn radius thereby inhibiting said trailer from jackknifing on said tow vehicle, each of said bumpers comprising a bumper pad and a pair of lobes each extending away from a back surface of said bumper pad, each of said lobes associated with each of said bumpers having a hole extending through said lobes, said second end of a respective one of said pair of arms being positionable between said pair of lobes associated with a respective one of said pair of bumpers such that a respective one of said holes in said respective arm is aligned with said hole in each of said lobes associated with said respective bumper thereby facilitating a respective one of said bolts to be inserted through said pair of lobes of said respective bumper and said respective arm for pivotally attaching said respective bumper to said respective arm, each of said pair of bumpers being positionable to facilitate a front surface of said bumper pad associated with each of said bumpers to be directed toward the hitch of the trailer, said front surface of said bumper pad associated with each of said bumpers being comprised of a resiliently compressible material such that said front surface is inhibited from damaging said hitch of said trailer;

a pair of stops, each of said stops being attachable to a respective one of said stop points of said pivot mount thereby facilitating each of said pair of stops to inhibit a respective one of said arms from pivoting toward said tow vehicle such that said pair of stops facilitates said pair of arms to inhibit said trailer from jackknifing on said tow vehicle, each of said stops having a primary end, a secondary end, an upper surface and a lower surface, said secondary end of each of said stops being rounded about an axis extending through said upper surface and said lower surface, each of said stops flaring between said secondary end and said primary end such that said primary end has a greater width than said secondary end, each of said stops having a hole extending through said upper surface and said lower surface, said hole in a respective one of said stops being aligned with a respective one of said first stop holes, said hole in a respective one of said stops being aligned with a respective one of said second stop holes, a respective one of said bolts being insertable through said pair of pivot panels and a respective one of said pair of stops for attaching said stops to said pivot panels, each of said stops being positionable between said respective arm and said central panel of said pivot mount when to retain said pair of arms in a deployed position for inhibiting said trailer from jackknifing, each of said pair of arms being positionable between said central panel of said pivot mount and a respective one of said stops for retaining said pair of arms in a stored position thereby inhibiting either of said pair of arms from abutting said hitch of said trailer;

a pair of tethers, each of said tethers being coupled to and extending away from said primary end of a respective one of said stops, each of said tethers having a ring being disposed on a distal end of said tethers with respect to said primary end of said respective stop, said ring on each of said pair of tethers being aligned with a respective one of said bolt holes in a respective one of said pivot panels, a respective one of said bolts being extendable through said ring on a respective one of said tethers to inhibit said respective stop from being lost when said respective stop is not attached to said pivot mount; and a plurality of pins, a respective one of said pins being insertable through said pair of first holes in said extension tube for attaching said extension tube to said hitch receiver of said tow vehicle, a respective one of said pins being insertable through said pair of second holes in said extension tube for attaching a hitch ball to said extension tube, a respective one of said pins being insertable through respective ones of said first stop holes and a respective one of said stops, a respective one of said pins being insertable through respective ones of said second stop holes and a respective one of said stops.

* * * * *